United States Patent [19]

Ichikawa et al.

[11] Patent Number: 5,414,309
[45] Date of Patent: May 9, 1995

[54] CIRCUIT FOR APPLYING DIRECT CURRENT TO WINDING

[75] Inventors: Syuzi Ichikawa; Kazuhiro Umeda, both of Tokyo, Japan

[73] Assignee: Tokyo Tsuki Co., Ltd., Tokyo, Japan

[21] Appl. No.: 176,086

[22] Filed: Dec. 30, 1993

[30] Foreign Application Priority Data

Oct. 19, 1993 [JP] Japan ................... 5-260836

[51] Int. Cl.⁶ .............................................. H03K 3/30
[52] U.S. Cl. .................................. 327/110; 327/190; 327/306; 327/482
[58] Field of Search ............. 307/254, 264, 270, 282, 307/299.3, 296.1, 491, 268

[56] References Cited

U.S. PATENT DOCUMENTS

| | | | |
|---|---|---|---|
| 2,979,627 | 4/1961 | Halpern | 307/282 |
| 3,612,909 | 10/1971 | Imabayashi | 307/282 |
| 3,666,971 | 5/1972 | Bixby et al. | 307/282 |
| 3,668,435 | 6/1972 | Farnsworth et al. | 307/270 |
| 3,728,559 | 4/1973 | Spann et al. | 307/270 |
| 3,778,639 | 12/1973 | Higuchi et al. | 307/270 |
| 3,930,171 | 12/1975 | Takahashi | 307/270 |
| 3,999,086 | 12/1976 | Ekelund | 307/254 |
| 4,567,379 | 1/1986 | Corey et al. | 307/270 |
| 4,728,817 | 3/1988 | Jessee et al. | 307/270 |
| 4,928,053 | 5/1990 | Sicard et al. | 307/270 |

FOREIGN PATENT DOCUMENTS

| | | | |
|---|---|---|---|
| 1129886 | 11/1965 | United Kingdom | 307/282 |
| 4189938 | 8/1974 | U.S.S.R. | 307/282 |
| 0608255 | 5/1978 | U.S.S.R. | 307/282 |

*Primary Examiner*—Terry D. Cunningham
*Attorney, Agent, or Firm*—Spensley Horn Jubas & Lubitz

[57] ABSTRACT

A circuit for applying a direct current to a winding. One end of a primary winding of a transformer is connected to a first transistor via a resistor. The other end of the primary winding is connected to a second transistor. The first and second transistors constitute a current mirror circuit. By by-passing through a capacitor, no alternating current flows in the first transistor. The primary winding of the transformer includes a center tap and an AC/DC superimposed signal is input to the primary winding via the center tap. In the primary winding, DC components flow so as to mutually negate DC-magnetization. As a result, there is no need to provide a gap in a magnetization circuit and the construction of the whole circuit including the transformer can be miniaturized with improved characteristics.

7 Claims, 3 Drawing Sheets

CIRCUIT FOR APPLYING DIRECT CURRENT TO WINDING

BACKGROUND OF THE INVENTION a) Field of the Invention

The present invention relates to a circuit for applying a direct current to a winding of a transformer, a choke coil or the like used in a variety of transmission circuits.

b) Description of the Related Art

In a conventional facsimile apparatus, for example, in order to pick up an alternating current (AC) component from a signal containing a direct current (DC) component and the AC component, a transformer shown in FIG. 4 is used. In this drawing, a primary winding of a transformer $T_1$ and a choke coil $L_1$ are connected in parallel with each other via a DC-isolation capacitor $C_1$ and a secondary winding of the transformer $T_1$ is coupled with a load impedance Z. Hence, when an AC/DC superimposed signal is input to the circuit of the primary winding side of the transformer $T_1$, only the AC component is applied to the transformer $T_1$. However, in this construction, the choke coil $L_1$ becomes large and as a result, the size of this entire circuit also becomes large. Further, since the choke coil $L_1$ is used, the cost of the parts become expensive.

In order to solve such a problem, for instance, a DC-superimposable transformer $T_2$ can be used without requiring the choke coil $L_1$ and the DC-isolation capacitor $C_1$, as shown in FIG. 5. In this DC-superimposable transformer $T_2$, a large gap is provided in its magnetic path so as to negate the influence of the DC-magnetization, permitting the applying of the DC component.

However, in the construction shown in FIG. 5, since the gap is provided so as to kill the influence of the DC-magnetization, the external shape and size of a core of the transformer $T_2$ becomes large and thus its overall dimension becomes large. For example, in the use in the aforementioned facsimile apparatus, numbers of turns of the primary and secondary windings of the trans-former $T_2$ are each 1600 and its core size is 35 mm (a so-called EI-35). Furthermore, in this case, even when such a large sized transformer $T_2$ is used, large attenuation of approximately 3 dB at 100 Hz is results, as shown in FIG. 6.

SUMMARY OF THE INVENTION

It is therefore a first object of the present invention to provide a circuit in view of the aforementioned problems of the prior art, which is capable of applying a direct current to a winding of a transformer or a choke coil.

It is a second object of the present invention to provide a circuit capable of achieving the above-described object without the need for a large sized circuit construction.

It is a third object of the present invention to provide a circuit capable of improving characteristics of the transformer or the choke coil.

A circuit according to the present invention is a circuit for applying a direct current to a winding of a transformer or a coil and comprises:

a) a current mirror circuit having a diode side circuit connected to one side of the winding and a transistor side circuit connected to another side of the winding, the winding having a center tap through which a signal current is input to the winding, the signal current containing a direct current component, and an alternating current component, a current which flows in the transistor side circuit having a value of a predetermined mirror ratio times as much as a value of a current which flows om the diode side circuit; and b) a by-pass circuit for by-passing the alternating current component of the signal current input to the winding to outside of the current mirror circuit so that only the direct current component of the input signal current is input to current mirror circuit.

Also, the winding is, for example, a primary winding of the transformer or a winding of a choke coil. The mirror ratio of the current mirror circuit is preferably one. The by-pass circuit includes a capacitor connected in parallel with the diode side circuit of the current mirror circuit and a resistor connected in series to the diode side circuit of the current mirror circuit. The diode side circuit of the current mirror circuit can be constructed by using a diode but is preferably constructed by using a transistor having a base and a collector which are short-circuited.

In the present invention, the DC component of an AC/DC superimposed signal supplied to the winding is taken by the current mirror circuit. The AC component is by-passed to outside of the current mirror circuit by the by-pass circuit via a part of the winding. Hence, the AC component containing part of the winding, performs the original function of the winding of the transformer or the choke coil. On the other hand, since the DC component flows in two directions separated (into the diode side circuit and the transistor side circuit of the current mirror circuit) from the center tap of the winding, the influence of the magnetization by the DC components can be mutually negated. Therefore, the provision of a gap considering the influence of the DC-magnetization is not required and the enlarging of the external dimension and the deterioration of the characteristics will not be caused. In addition, at an evaluation of its characteristics, even when the AC/DC superimposed signal is input or only the AC component is input, its characteristics are hardly changed and thus the evaluation and the examination can be readily carried out.

BRIEF DESCRIPTION OF THE DRAWINGS

These and other objects, features and advantages of the present invention will more fully appear from the following description of the preferred embodiments with reference to the accompanying drawings, in which.

DESCRIPTION OF THE PREFERRED EMBODIMENTS

Figure 1:
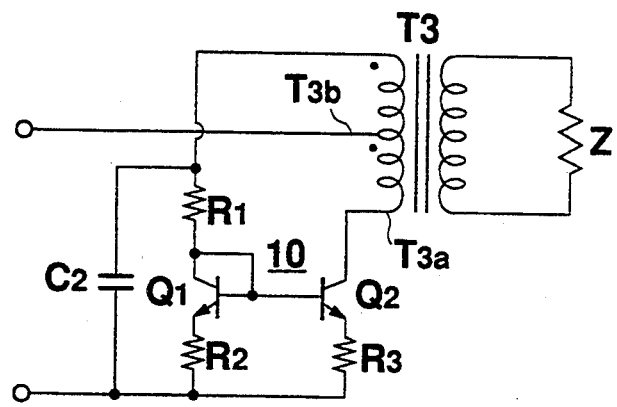
FIG. 1 is a circuit diagram showing a first embodiment of a circuit for applying a direct current to a winding according to the present invention.

The present invention will now be described in connection with its preferred embodiments with reference to the accompanying drawings, wherein like reference characters designate like or corresponding parts throughout the views and thus the repeated description thereof can be omitted for brevity.

In FIG. 1, there is shown the first embodiment of a circuit for applying a direct current (DC) to a winding of a transformer or a choke coil according to the present invention. In this circuit, a transformer $T_3$ having two-channel primary winding $T_{3a}$ is used. A secondary winding of the transformer $T_3$ is connected to a load impedance Z. An AC/DC superimposed signal is input to a center tap $T_{3b}$ of the primary winding $T_{3a}$.

One end of the primary winding $T_{3a}$ is connected to a collector of one transistor $Q_1$ via a resistor $R_1$ and the other end of the primary winding $T_{3a}$ is directly coupled with a collector of another transistor $Q_2$. A base and the collector of the transistor $Q_1$ are short-circuited. Hence, this transistor $Q_1$ functions as a diode. Emitters of the transistors $Q_1$ and $Q_2$ are connected to an input terminal via respective resistors $R_2$ and $R_3$. The bases of the transistors $Q_1$ and $Q_2$ are connected with each other and thus these transistors $Q_1$ and $Q_2$ constitute a current mirror circuit 10. Further, a capacitor $C_2$ is connected between the one end of the primary winding $T_{3a}$ and the input terminal. Thus, the resistor $R_1$ is arranged between one end of the primary winding $T_{3a}$ and the transistor $Q_1$ and the capacitor $C_2$ by-passes the resistor $R_1$, the transistor $Q_1$ and the resistor $R_2$.

In the circuit having such a construction, when the AC/DC superimposed signal is input to the center tap $T_{3b}$ of the primary winding $T_{3a}$, its DC component is taken into the current mirror circuit 10 via the primary winding $T_{3a}$. That is, the DC current supplied via the center tap $T_{3b}$ is taken into the transistor $Q_1$ of the current mirror circuit 10 via one part (the upper side in FIG. 1) of the primary winding $T_{3a}$ and the same value of the DC current (when a mirror ratio is 1) is input to the transistor $Q_2$ via the other side (the lower side in FIG. 1) of the primary winding $T_{3a}$. At this time, because of the presence of the resistor $R_1$, the AC component is bypassed by the capacitor $C_2$ and does not flow into the transistor $Q_1$. As a result, the DC components flow in the opposite directions on the upper and lower sides of the center tap $T_{3b}$ and hence the DC-magnetization caused by applying the DC components to the primary winding $T_{3a}$ of the transformer $T_3$ can be negated. Therefore, the provision of a gap to consider the DC-magnetization, and in turn, the large size of the transformer $T_3$ can be prevented. In this case, with respect to the primary winding $T_{3a}$ of the transformer $T_3$, namely the part on the lower side in FIG. 1 (the part on the $Q_2$ side of the current mirror circuit 10), no AC component flows there in and thus the lower side part does not act as the primary winding in itself of the transformer $T_3$, and only the part on the upper side in FIG. 1 (the part on the transistor $Q_1$ side of the current mirror circuit 10) can function as the primary winding in itself of the transformer $T_3$.

When the circuit described above in this embodiment is applied to a facsimile apparatus, a total of 800 turns and 400 turns can suffice for the number of turns of the respective primary and secondary windings of the transformer $T_3$ and 14 mm (a so-called EI-14) in core size is sufficient. Further, this circuit can be constructed by using general purpose parts. For instance, for the transistors $Q_1$ and $Q_2$, transistors such as 2SC1815 and the like can be used and for the resistors $R_1$ and $R_2$ and the capacitor $C_2$, a resister of 150Ω and a capacitor of 100 μF can be used. That is, the circuit can be realized by using elements of general specifications and values.

Figure 2:
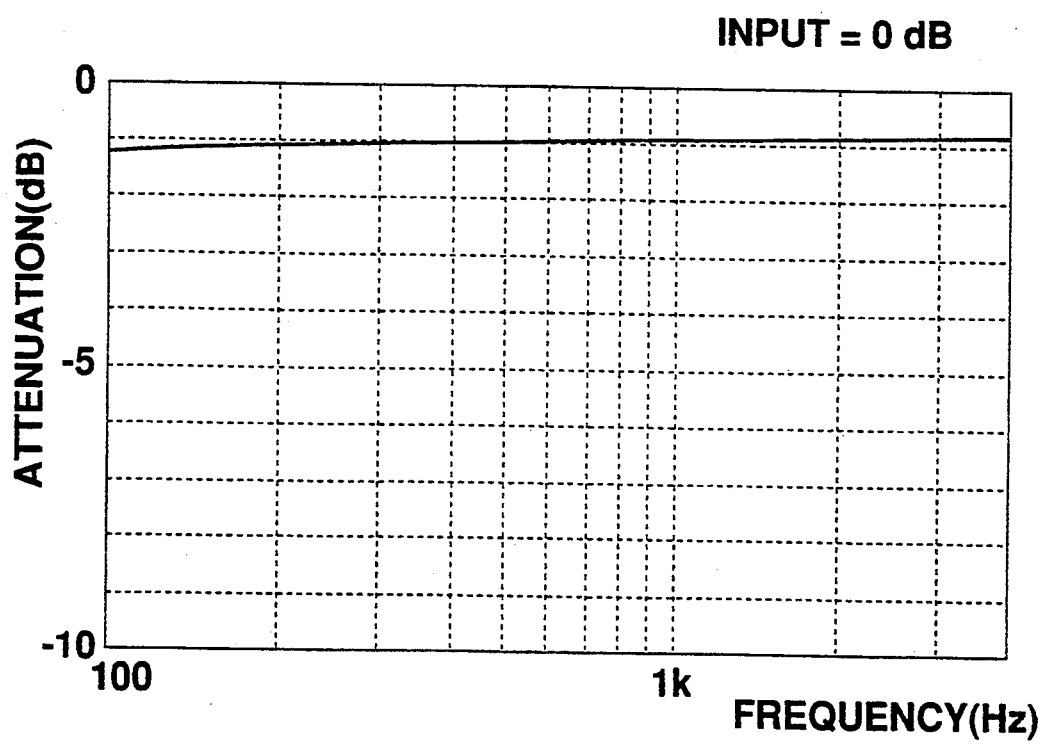
FIG. 2 is a graphical representation showing characteristics of the circuit shown in FIG. 1.

Furthermore, in this embodiment, the characteristics of the circuit can be remarkably improved in comparison with the aforementioned second conventional embodiment. That is, as shown in FIG. 2, for example, attenuation at 100 Hz is reduced to approximately −1 dB and further attenuation characteristics become nearly flat in a range from low frequencies to high frequencies. Moreover, the characteristics of this circuit are hardly any different when the AC/DC superimposed signal is input and only the AC component is input, and hence evaluation and examination of the characteristics can be readily carried out.

Figure 3:
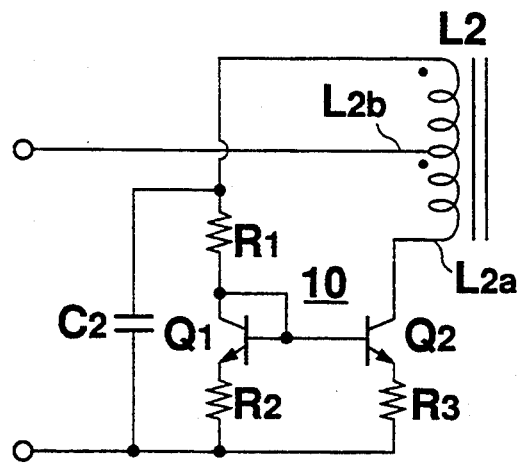
FIG. 3 is a circuit diagram showing a second embodiment of a circuit for applying a direct current to a winding according to the present invention.
Figure 4:
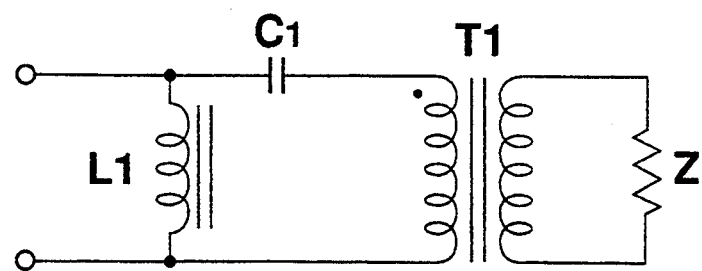
FIG. 4 is a circuit diagram of a conventional circuit for applying a direct current to a winding.
Figure 5:
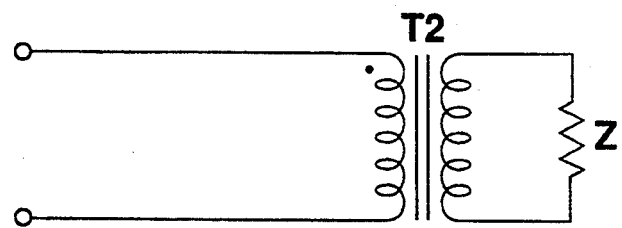
FIG. 5 is a circuit diagram of another conventional circuit for applying a direct current to a winding.
Figure 6:
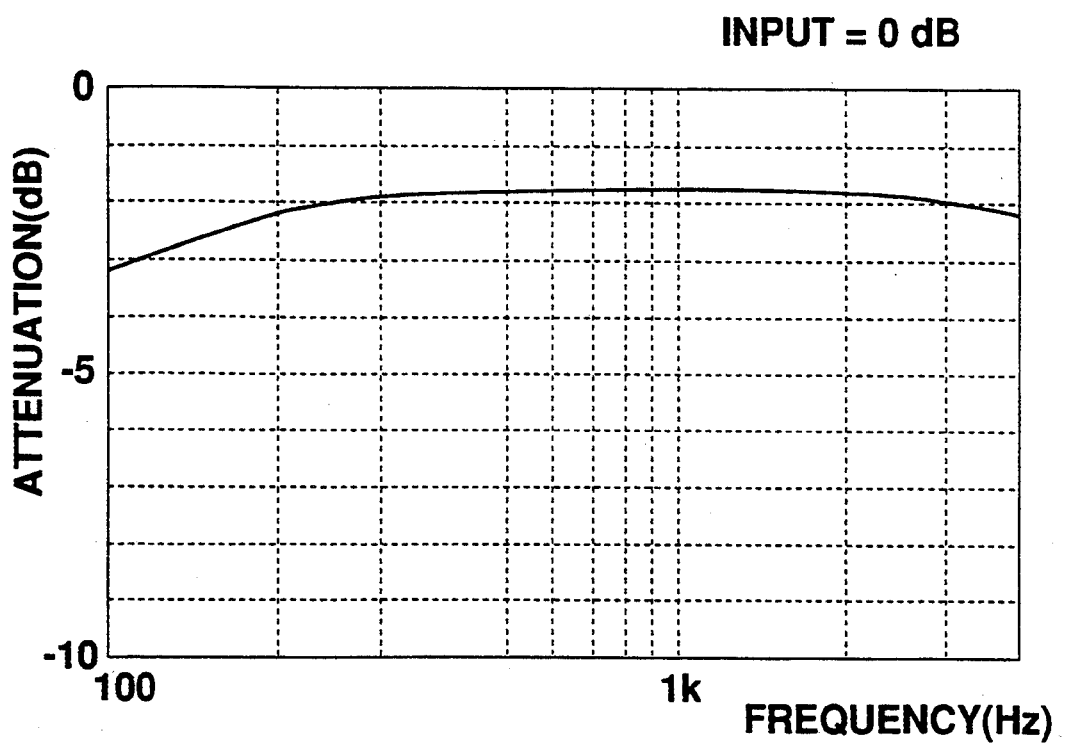
FIG. 6 is a graphical representation showing characteristics of the circuit shown in FIG. 5.

In FIG. 3 there is shown the second embodiment of a direct current applying circuit according to the present invention. In this embodiment, a choke coil $L_2$ including a winding or coil $L_{2a}$ with a center tap $L_{2b}$ is used in place of the transformer $T_3$ in the first embodiment. That is, in this case, the circuit shown in FIG. 3 is a circuit for applying the direct current to the choke coil $L_2$, which is different from the first embodiment. In this embodiment, the effects such as the miniaturization of its dimension and the like can be obtained in the same manner as the first embodiment.

In the embodiments described above, the mirror ratio of the current mirror circuit 10 is determined to 1. This concerns the fact that the number of turns of the upper and lower parts separated by the center tap $T_{3b}$ or $L_{2b}$ of the primary winding $T_{3a}$ of the transformer $T_3$ or the coil $L_{2a}$ are the same. However, when the present invention is implemented, mirror ratios other than 1 can be designed. That is, depending on the position setting of the center tap $T_{3b}$ or $L_{2b}$, the transistors $Q_1$ and $Q_2$ having suitable emitter cross sections can be used. However, from the viewpoint of reducing the influence of the DC-magnetization or of the low cost construction, the mirror ratio of 1 is most preferable. Further, the value of the resistor $R_1$ can be determined depending on the DC current value. Moreover, the transistor $Q_1$ used in the diode-connection can be replaced with a diode.

As described above, according to the present invention, only the DC component of the signal supplied to the winding is taken into the current mirror circuit and the input of the signal to the winding is executed via the center tap. Hence, when the AC/DC superimposed signal is input to the winding, the DC-magnetization caused by the DC components can be negated and as a result, the provision of the gap to consider the influence of the DC-magnetization, and in turn, the large size of the dimension and the deterioration of the characteristics can be prevented. Accordingly, a miniaturized direct current applying circuit having good characteristics can be obtained. In addition, in this direct current applying circuit, the characteristics are not changed when the AC/DC superimposed signal is input and only the AC component is input and hence the evaluation by only the AC component can be carried out. Furthermore, this direct current applying circuit can be used for not only the facsimile apparatus but also various general transmission circuits.

Although the present invention has been described in its preferred embodiments with reference to the accompanying drawings, it is readily understood that the present invention is not restricted to the preferred embodiments and that various changes and modifications can be made by those skilled in the art without departing from the spirit and scope of the present invention.

What is claimed is:

1. A circuit for applying a direct current to a winding of a transformer or a coil, comprising:
   a) a current mirror circuit having a diode side circuit connected to one side of the winding and a transistor side circuit connected to another side of the winding, the winding having a center tap through which a signal current is input to the winding, the signal current containing a direct current component and an alternating current component, a current which flows in the transistor side circuit having a value of a predetermined mirror ratio times as much as a value of a current flowing in the diode side circuit; and
   b) a by-pass circuit connected to said winding for by-passing the alternating current component of the signal current input to the winding to outside of the current mirror circuit so that only the direct current component of the input signal current is input to current mirror circuit.

2. The circuit of claim 1, wherein the winding is a primary winding of the transformer.

3. The circuit of claim 1, wherein the winding is a winding of a choke coil.

4. The circuit of claim 1, wherein the mirror ratio of the current mirror circuit is one.

5. The circuit of claim 1, wherein the by-pass circuit includes a capacitor connected in parallel with the diode side circuit of the current mirror circuit.

6. The circuit of claim 1, wherein the circuit further comprises a resistor connected in series to the diode side circuit of the current mirror circuit.

7. The circuit of claim 1, wherein the diode side circuit of the current mirror circuit includes a transistor having a base and a collector which are short-circuited.

* * * * *